United States Patent [19]

Arai et al.

[11] Patent Number: 5,425,616

[45] Date of Patent: Jun. 20, 1995

[54] MICROMOTION STAGE

[75] Inventors: Tatsuo Arai, Tsukuba; Naotaka Komatsu, Yokohama, both of Japan

[73] Assignee: Agency of Industrial Science & Technology, Ministry of International Trade & Industry, of Tokyo, Japan

[21] Appl. No.: 219,306

[22] Filed: Mar. 28, 1994

[30] Foreign Application Priority Data

Jul. 15, 1993 [JP] Japan .................................. 5-175414

[51] Int. Cl.⁶ .............................................. B25J 11/00
[52] U.S. Cl. .................................. 414/680; 74/490.09; 901/28
[58] Field of Search ............... 414/680; 901/28, 29, 901/15; 74/469, 479 R, 479 BP, 479 BJ, 479 BW, 479 PF, 479 PH, 479 MF; 310/317, 318, 328; 269/289 R, 309

[56] References Cited

U.S. PATENT DOCUMENTS 4,651,589  3/1987  Lambert .......................... 901/28 X
5,053,687  10/1991  Merlet ............................. 901/28 X

*Primary Examiner*—Donald W. Underwood
*Attorney, Agent, or Firm*—Olbon, Spivak, McClelland, Maier, & Neustadt

[57] ABSTRACT

A micromotion stage comprises a stationary plate and a moving plate connected by six links each consisting of a stacked piezoelectric element serving as an actuator, a holder fixed at one end of the stacked piezoelectric element, a capacitance type displacement gage retained by the holder and a target member fixed at the other end of the stacked piezoelectric element to have a part thereof face a tip portion of the capacitance type displacement gage across a small gap. Change in the distance between the holder and the target member caused by expansion or contraction of the stacked piezoelectric element and indicative of a change in the link stroke can be detected by the capacitance type displacement gage.

1 Claim, 5 Drawing Sheets

MICROMOTION STAGE

BACKGROUND OF THE INVENTION

1. Field of the Invention

This invention relates to a micromotion stage for use as a positioning mechanism in devices for fine positioning of objects, semiconductor production equipment, printing machines, scanning-tunneling microscopes and other such precision equipment, and more particularly to means for detecting and controlling the state, specifically the position and attitude, of a micromotion stage.

2. Description of the Prior Art

FIG. 5 shows the arrangement of a prior art micromotion stage and the associated control system. The main micromotion stage unit A shown at the bottom of the figure consists of a moving plate 1, a stationary plate 2 and six links 3 (only one shown) connecting the moving and stationary plates. The stroke of each of the links 3 can be extended and contracted by a stacked piezoelectric element 4. By controlling the strokes of the six links 3, it is possible to move the moving plate 1 with respect to the stationary plate 2 with six degrees of freedom including three degrees of translational freedom and three degrees of rotational freedom.

In the illustrated example, the means for detecting the strokes of the links 3 includes strain gages 16 (only one shown) bonded to the surfaces of the individual links 3. The strain signal produced by each strain gage 16 in proportion to its expansion/contraction is detected by a link stroke detection system B consisting of a bridge box 17, a strain AMP 18 and an A/D converter 19, and the result of the detection is output to a control unit 11. The control unit 11 produces a control signal and applies it to a piezoelectric element drive system C consisting of a D/A converter 12 and a drive AMP 13 for driving and controlling the stacked piezoelectric element 4.

In the example shown in FIG. 5, the strain gages 16 have to be bonded to the stacked piezoelectric elements 4 in precise alignment with their direction of expansion and contraction. In addition, the surface of the stacked piezoelectric element 4 on which the strain gage 16 is bonded has to be precision finished to a high degree of flatness to eliminate all waviness and other irregularities.

Furthermore, while the illustrated example enables detection and control of the individual link strokes of the micromotion stage unit A, it does not allow detection of the position and attitude of the moving plate 1. Thus the arrangement is technically disadvantageous in that the control system for controlling the moving plate 1 detects and controls only the link strokes, i.e., is merely a semi-closed system, and because of this is unable to control the position and attitude of the moving plate 1 with high precision.

The object of the present invention is to provide a micromotion stage that eliminates the work of bonding strain gages required for the fabrication of prior art micromotion stages and that, moreover, enables the detection of the position and attitude of a moving plate, which has been difficult to achieve by the prior art, to be connected with ease and high reliability.

SUMMARY OF THE INVENTION

A first aspect of the invention achieves this object by providing a micromotion stage having links whose strokes are controlled by actuators constituted as stacked piezoelectric elements, the micromotion stage comprising a stationary plate provided along its edge with three substantially equally spaced connection points, a moving plate disposed above the stationary plate and provided along its edge with three substantially equally spaced connection points offset about 60 degrees from the connection points of the stationary plate, six links each having its opposite ends connected to connection points of the stationary plate and the moving plate, six actuators provided one on each of the six links for extending and contracting the links, six holders each fixed at one end of a stacked piezoelectric element, six capacitance type displacement gages each retained in parallel with a stacked piezoelectric element by a holder, and six target members each fixed at the other end of a stacked piezoelectric element to have a part thereof face a tip portion of a capacitance type displacement gage across a small gap.

In a second aspect of the invention, a micromotion stage having links whose strokes are controlled by actuators comprises a moving plate supported horizontally above a stationary plate by links and having first to third target surfaces lying perpendicular to x, y and z axes of a Cartesian coordinate system, two capacitance type displacement gages attached at a prescribed spacing to have their axes parallel to the x-axis and to have their one ends facing the first target surface, one capacitance type displacement gage attached to have its axis parallel to the y-axis and to have its one end facing the second target surface, and three capacitance type displacement gages attached to have their axes parallel to the z-axis and such that the points of intersection of their axes with an xy plane including the x-axis and the y-axis are the apices of a right triangle in the xy plane and the sides of the right triangle adjacent to the right angle lie parallel to the x-axis and the y-axis.

As described in the foregoing, the six links of the micromotion stage according to the first aspect of the invention each comprises a stacked piezoelectric element serving as an actuator, a holder fixed at one end of the stacked piezoelectric element, a capacitance type displacement gage retained by the holder and a target member fixed at the other end of the stacked piezoelectric element to have a part thereof face a tip portion of the capacitance type displacement gage across a small gap. Owing to this configuration, the distance between the holder and the target member varies with the expansion/contraction of the stacked piezoelectric element. When the stacked piezoelectric element expands or contracts, the resulting change in the distance between the holder and the target member can be detected by the capacitance type displacement gage as a change in the link stroke.

In the micromotion stage according to the second aspect of the invention, the two first capacitance type displacement gages are attached at a prescribed spacing to have their axes parallel to the x-axis and to have their one ends facing the first target surface, one capacitance type displacement gage is attached to have its axis parallel to the y-axis and to have its one end facing the second target surface, and three capacitance type displacement gages are attached to have their axes parallel to the z-axis and such that the points of intersection of their axes with an xy plane including the x-axis and the y-axis are the apices of a right triangle in the xy plane and the sides of the right triangle adjacent to the right angle lie parallel to the x-axis and the y-axis. This configuration enables the aforesaid two displacement gages to detect the displacement of the moving plate parallel to the x-axis and the yaw angle thereof (about the z-axis), the aforesaid one displacement gage to detect its displacement parallel to the y-axis, and the aforesaid three displacement gages to detect its displacement parallel to the z-axis, the roll angle thereof (about the x axis) and the pitch angle thereof (about the y-axis).

The above and other features of the present invention will become apparent from the following description made with reference to the drawings.

DESCRIPTION OF THE PREFERRED EMBODIMENTS

Figure 1A:
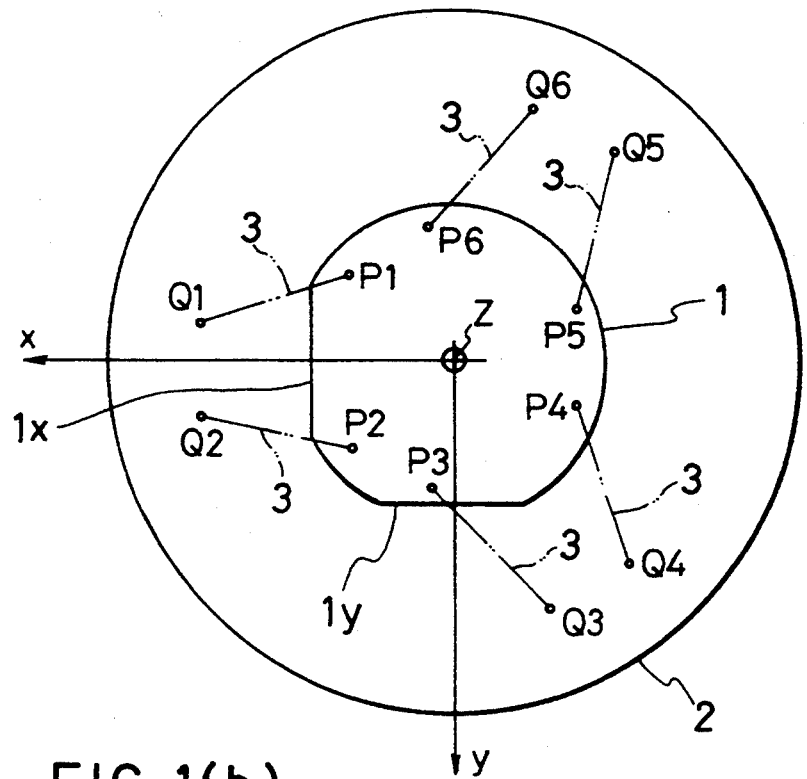
FIG. 1(a) is a schematic plan view of an embodiment of the micromotion stage according to the invention.
Figure 1B:
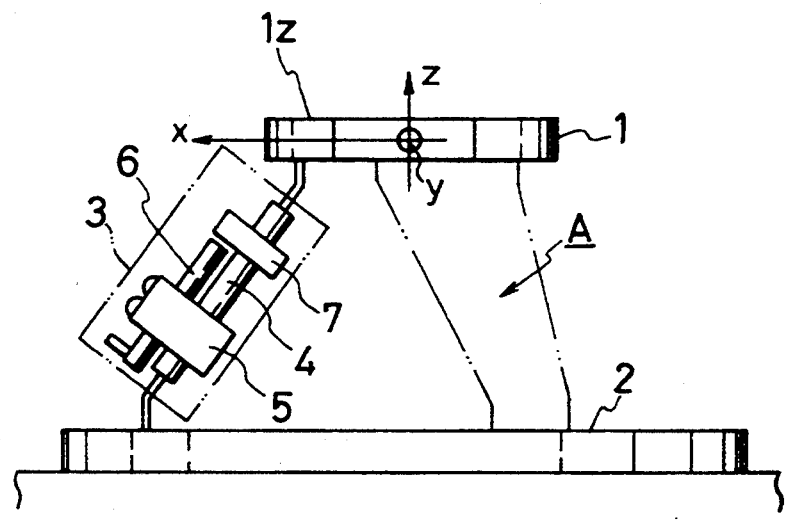
FIG. 1(b) is a front view of the micromotion stage of FIG. 1(a).

The configuration of a micromotion stage unit A according to a first embodiment of the invention is shown in FIGS. 1(a) and 1(b). The micromotion stage unit A comprises a moving plate 1 provided along its edge with three pairs of substantially equally spaced connection points $Q_1$ and $Q_2$, $Q_3$ and $Q_4$, and $Q_5$ and $Q_6$ provided along its edge. It also has a stationary plate 2 provided along its edge with three pairs of substantially equally spaced connection points $P_1$ and $P_2$, $P_3$ and $P_4$, and $P_5$ and $P_6$ offset about 60 degrees from the connection points of the stationary plate. Each point $P_i$ (i=1-6) on the stationary plate 2 is connected to a point $Q_i$ on the moving plate 1 by one of six links 3. The center of the moving plate 1 is defined as being at the origin of a three-dimensional Cartesian coordinate system whose x- and y-axes lie parallel to the top and bottom surfaces thereof. The moving plate 1 is provided with a first target surface 1x perpendicular to the x-axis, a second target surface 1y perpendicular to the y-axis and a third target surface 1z perpendicular to the z-axis.

Figure 2:
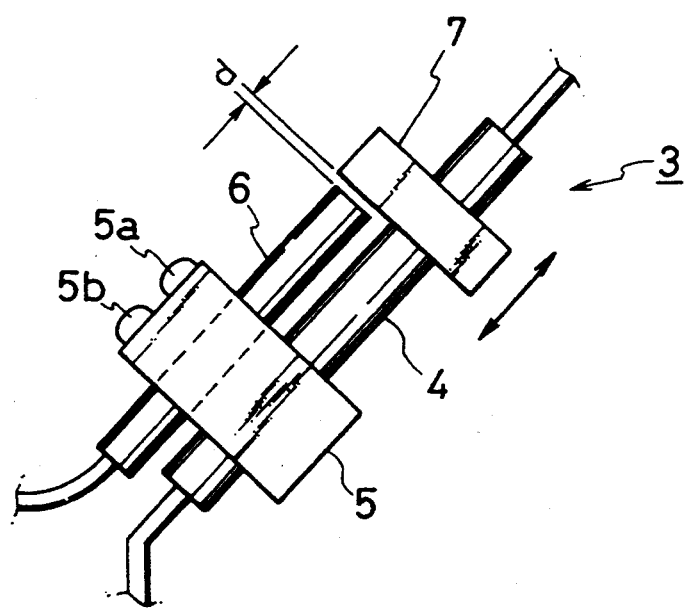
FIG. 2 is an enlarged view of an essential portion of a link of the micromotion stage of FIG. 1(a).

One of the links 3 indicated in FIGS. 1(a) and 1(b) is shown in detail in FIG. 2. It comprises a stacked piezoelectric element 4 having a holder 5 fixed near one end. A capacitance type displacement gage 6 is fastened to the holder 5 by screws 5a, 5b so as to extend parallel to the stacked piezoelectric element 4. A target member 7 is fixed to the other end of the stacked piezoelectric element 4 with a part thereof facing the tip of the capacitance type displacement gage 6 across a small gap d. The magnitude of the gap d is determined based on the amount of expansion/contraction of the stacked piezoelectric element 4 and the sensitivity of the capacitance type displacement gage 6, generally within the range of 5–50 μm. When the stacked piezoelectric element 4 expands or contracts, the resulting change in the distance between the holder 5 and the target member 7 is detected by the capacitance type displacement gage 6 as the change in the stroke of the link 3.

Figure 3A:
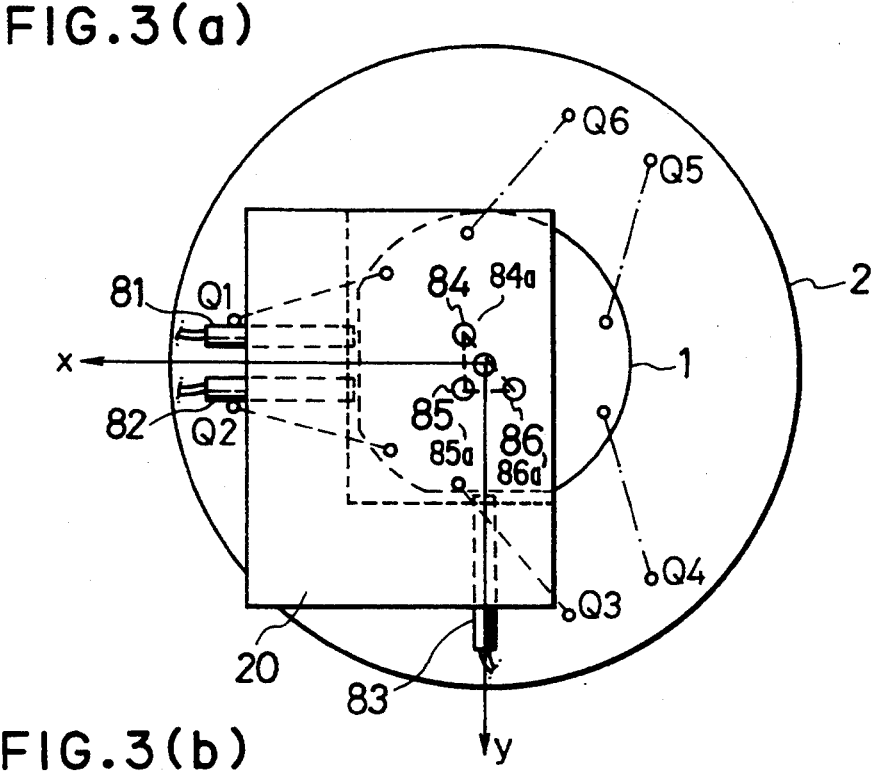
FIG. 3(a) is a schematic plan view of another embodiment of the micromotion stage according to the invention.
Figure 3B:
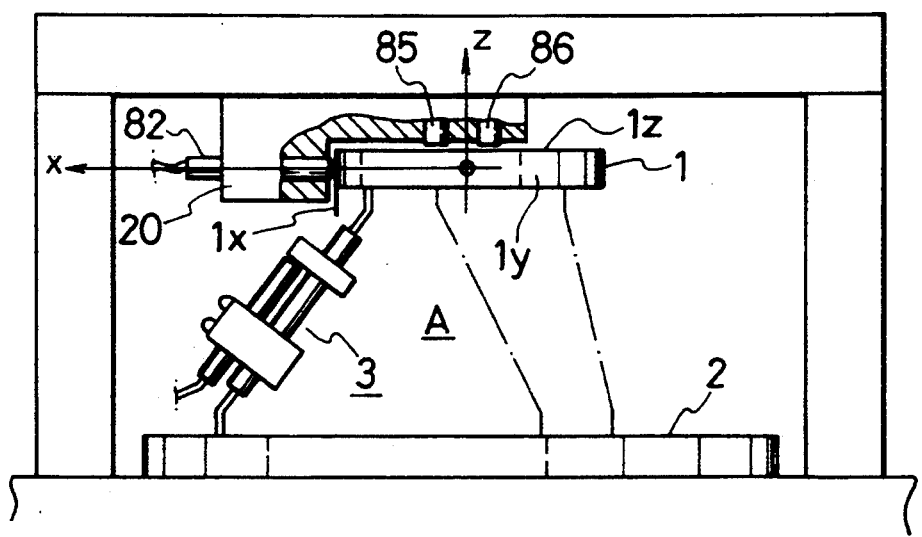
FIG. 3(b) is a front view of the micromotion stage of FIG. 3(a).

FIGS. 3 (a) and 3 (b) show the moving plate 1 position and attitude detection section. As shown in these figures, six capacitance type displacement gages 8 (81–86) are disposed to face the first to third target surfaces 1x–1z on the moving plate 1. More specifically, two capacitance type displacement gages 81, 82 are disposed at a prescribed spacing to have their axes parallel to the x-axis and their tips facing the first target surface 1x. The capacitance type displacement gages 81, 82 detect the distance between their tips and the first target surface 1x. The displacement of the moving plate 1 in the direction of the x-axis can thus be determined from the output of one or the other of these two displacement gages or from the average of the outputs of both.

One capacitance type displacement gage 83 is disposed to have its axis parallel to the y-axis and its tip facing the second target surface 1y. The capacitance type displacement gage 83 detects the distance between its tip and the second target surface 1y. The displacement of the moving plate 1 in the direction of the y-axis can thus be determined from the output of the capacitance type displacement gage 83.

Three capacitance type displacement gages 84–86 are disposed to have their axes parallel to the z-axis and such that the points of intersection of their axes with the xy plane including the x-axis and the y-axis are the apices 84a, 85a, 86a of a right triangle shown by phantom lines in FIG. 3(a) and intersecting the gages 84–86 in the xy plane and the sides of the right triangle adjacent to the right angle lie parallel to the x-axis and the y-axis. The capacitance type displacement gages 84–86 detect the distance between their tips and the third target surface 1z. The displacement of the moving plate 1 in the direction of the z-axis can thus be determined from the output of any one of these three displacement gages or from the average of their outputs.

The capacitance type displacement gages 81–86 are held to face the associated target surfaces by a retainer plate 20 positioned above the upper surface of the moving plate 1. The spacing between the capacitance type displacement gages and the target surfaces is determined based on the sensitivity of the gages and other such factors, generally in the range of 5-50 μm.

The angles of rotation of the moving plate 1 about the x-, y- and z-axes are calculated in the following manner.

Assume the attitude of the moving plate 1 has changed from its basic position by a roll angle (about the x-axis) of $\theta_{roll}$, a pitch angle (about the y-axis) of $\theta_{pitch}$ and a yaw angle (about the z-axis) of $\theta_{yaw}$. Then, defining the difference between the output voltage $V_i$ of any given displacement gage $S_i$ (i=1-6) at this time and the output voltage $V_{0i}$ of the same displacement gage in the basic position as $\Delta V_i$, we have $$\Delta V_1 = V_i - V_{0i}$$

Then applying the rules of trigonometry, $\theta_{roll}$, $\theta_{pitch}$ and $\theta_{yaw}$ can be expressed as $$\theta_{roll} = \tan^{-1}\{(\Delta V_5 - \Delta V_4)/L_{54}\} \quad (1)$$

$$\theta_{pitch} = \tan^{-1}\{(\Delta V_6 - \Delta V_5)/L_{65}\} \quad (2)$$

$$\theta_{yaw} = \tan^{-1}\{(\Delta V_2 - \Delta V_1)/L_{21}\} \quad (3)$$

where $L_{ij}$ is the distance between the centers of displacement gages $S_i$ and $S_j$. The attitude of the moving plate 1 can be ascertained from these equations.

It is thus possible to detect the displacement of the moving plate 1 parallel to the x-axis and the yaw angle thereof (about the z-axis) from the outputs of the displacement gages 81 and 82, to detect the displacement thereof parallel to the y-axis from the output of the displacement gage 83, to detect the displacement thereof parallel to the z-axis from the outputs of the displacement gages 84–86, to detect the roll angle thereof (about the x axis) from the outputs of the displacement gages 84 and 85, and to detect the pitch angle thereof (about the y-axis) from the outputs of the displacement gages 85 and 86.

Figure 4:
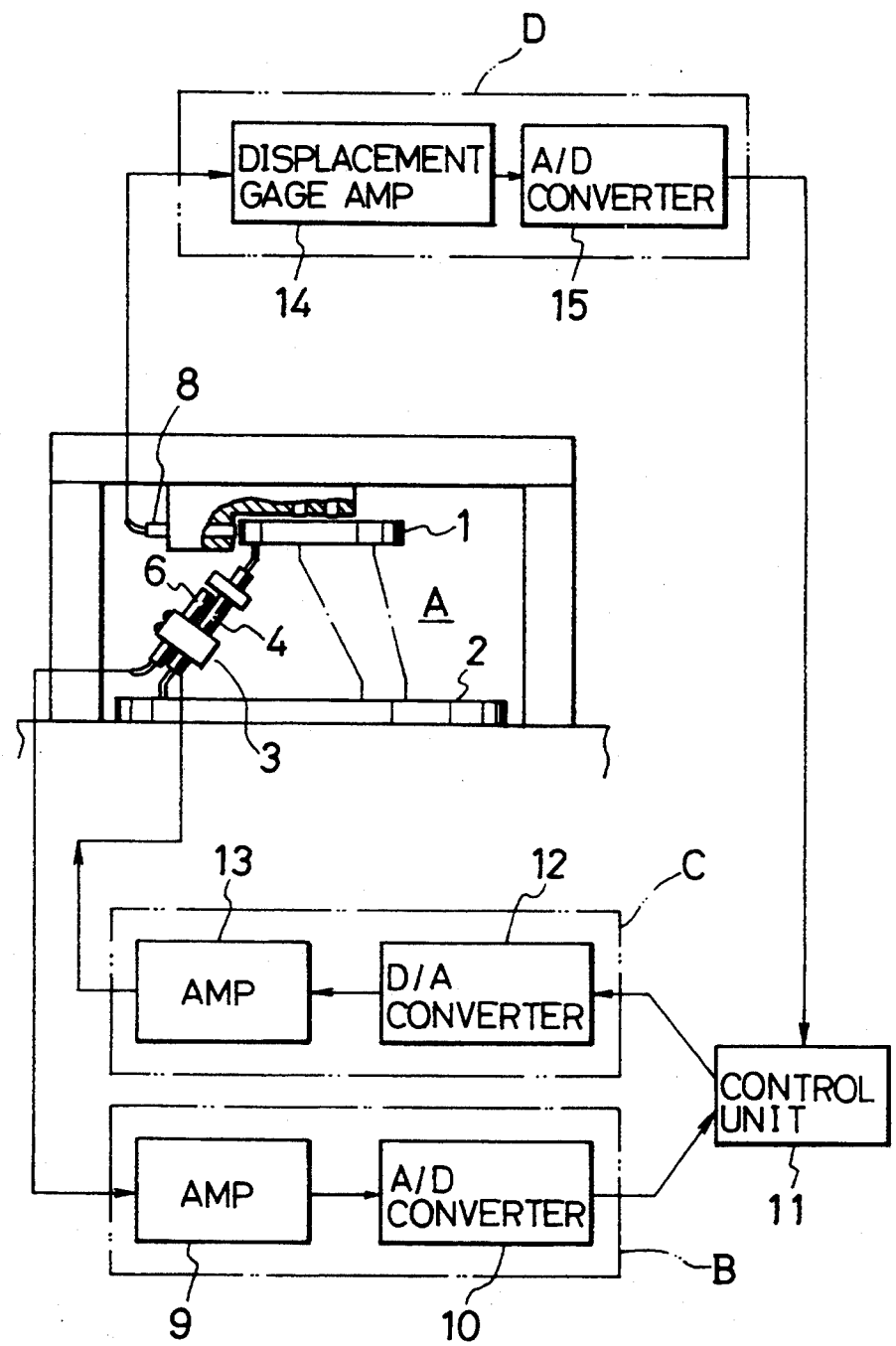
FIG. 4 is a block diagram of the control system of the micromotion stage of the micromotion stage of FIG. 3.
Figure 5:
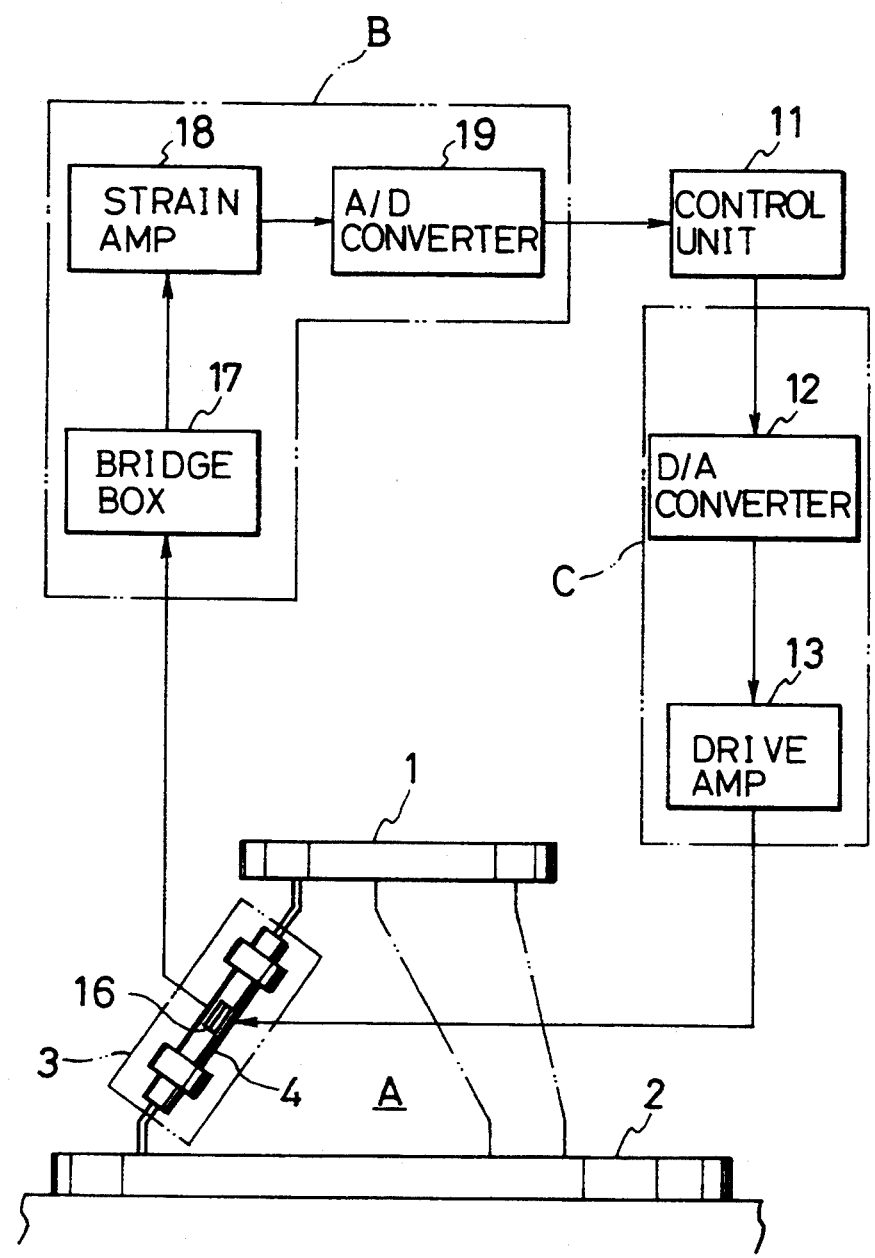
FIG. 5 is a schematic view showing an example of a prior art micromotion stage and its control system.

FIG. 4 shows the configuration of the six-degree-of-freedom micromotion stage unit A and the part of a control system thereof related to one degree of freedom.

The link stroke detected by the capacitance type displacement gage 6 is fed back to a control unit 11 through a link stroke detection system B consisting of a displacement gage AMP 9 and an A/D converter 10. On the other hand, the control unit 11 outputs a control signal (a drive voltage) through a piezoelectric element drive system C consisting of a D/A converter 12 and a drive AMP 13. The drive voltage is applied to the stacked piezoelectric element 4 to control its stroke.

The resulting change in the position and attitude of the moving plate 1 is detected by the capacitance type displacement gages 8 (81–86) facing the first to third target surfaces 1x, 1y and 1z provided on the moving plate 1 and the detection result is fed back to the control unit 11 through a moving plate position and attitude detection system D consisting of a displacement gage AMP 14 and an A/D converter 15.

The control unit 11 calculates the strokes of the individual links 3 required for realizing the target position and attitude of the moving plate 1, controls the expansion/contraction of the links 3 accordingly via the piezoelectric element drive system C, detects the actual strokes of the links 3 from the output of the link stroke detection system B, and controls link strokes.

In addition it receives a signal representing the actual position and attitude of the moving plate 1 from the moving plate position and attitude detection system D and conducts control for converging the actual position and attitude on the target position and attitude.

The invention is not limited to the embodiment described in the foregoing. For example, the three mutually perpendicular axes with respect to which the displacement gages 81–86 are disposed need not be the x, y and z axes shown in the drawings.

Obviously, numerous other modifications and variations of the present invention are also possible in light of the above teachings. It is therefore to be understood that within the scope of the appended claims, the invention may be practiced otherwise than as specifically described herein.

The invention provides a micromotion stage that eliminates the work of bonding strain gages required for the fabrication of prior art micromotion stages and that, moreover, enables the detection of the position and attitude of a moving plate, which has been difficult to achieve by the prior art, to be connected with ease and high reliability.

Japanese Patent Application No. 5-175414 filed Jul. 15, 1993 is hereby incorporated by reference.

What is claimed is:

1. A micromotion stage comprising:
   a moving plate supported horizontally above a stationary plate by links which expand and contract for providing strokes and having first to third target surfaces lying perpendicular to x, y and z axes of a Cartesian coordinate system;
   two capacitance type displacement gages attached at a prescribed spacing to have their longitudinal axes parallel to the x-axis and to have their one ends facing the first target surface;
   one capacitance type displacement gage attached to have its longitudinal axis parallel to the y-axis and to have its one end facing the second target surface;
   three capacitance type displacement gages attached to have their longitudinal axes parallel to the z-axis and such that the points of intersection of their axes with an xy plane including the x-axis and the y-axis are the apices of a right triangle in the xy plane and the sides of the right triangle adjacent to the right angle lie parallel to the x-axis and the y-axis; and
   whereby it is possible to detect positional and attitudinal changes in the moving plate caused by changes in the strokes of the links.

* * * * *